US012352185B1

(12) United States Patent
Morton et al.

(10) Patent No.: US 12,352,185 B1
(45) Date of Patent: Jul. 8, 2025

(54) OPEN ROTOR VARIABLE PITCH BLADE WITH RETRACTING INBOARD TRAILING EDGE

(71) Applicant: RTX Corporation, Farmington, CT (US)

(72) Inventors: Jeffrey T. Morton, Manchester, CT (US); Andrew E. Breault, Bolton, CT (US); Jon E. Sobanski, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/778,489

(22) Filed: Jul. 19, 2024

(51) Int. Cl.
*F01D 11/20* (2006.01)
*F01D 7/00* (2006.01)

(52) U.S. Cl.
CPC ................ *F01D 7/00* (2013.01); *F01D 11/20* (2013.01); *F05D 2220/323* (2013.01); *F05D 2240/125* (2013.01); *F05D 2240/307* (2013.01)

(58) Field of Classification Search
CPC ... F01D 7/00; F01D 11/20; F01D 5/20; F01D 11/16; F01D 11/22; F05D 2240/307; B64C 27/463; F04D 29/164
See application file for complete search history.

(56) References Cited

U.S. PATENT DOCUMENTS

| | | | | |
|---|---|---|---|---|
| 2,919,890 | A | 1/1960 | Smitth et al. | |
| 6,966,755 | B2 * | 11/2005 | Garner | F01D 11/16 416/107 |
| 7,549,841 | B1 * | 6/2009 | Marussich | F01D 11/12 416/224 |
| 10,550,712 | B2 * | 2/2020 | Durand | F01D 25/24 |
| 10,787,251 | B2 * | 9/2020 | Foskey | B64C 27/463 |
| 11,370,536 | B2 * | 6/2022 | Knoll | B64D 45/0005 |
| 2005/0175447 | A1 * | 8/2005 | Garner | F01D 5/20 415/173.3 |
| 2009/0269189 | A1 * | 10/2009 | Bottome | F01D 11/12 415/121.2 |
| 2018/0257767 | A1 * | 9/2018 | Foskey | B64C 27/37 |

FOREIGN PATENT DOCUMENTS

| | | | |
|---|---|---|---|
| CN | 109386313 | A | 2/2019 |

* cited by examiner

*Primary Examiner* — Eldon T Brockman

(57) ABSTRACT

An apparatus comprises a variable pitch blade configured to connect with an endwall of an open rotor engine. The variable pitch blade defines a chamber therein on a bottom edge thereof. A retractable edge member pivotally connects within the chamber to move between a first position wherein at least a portion of the retractable edge member is located within the chamber and a second position wherein a portion of the retractable edge member extends downward from the bottom edge of the variable pitch blade to block a gap between the bottom edge of the variable pitch blade and the endwall.

20 Claims, 9 Drawing Sheets

OPEN ROTOR VARIABLE PITCH BLADE WITH RETRACTING INBOARD TRAILING EDGE

TECHNICAL FIELD

This disclosure relates generally to an open rotor variable pitch blade. More specifically, this disclosure relates to an open rotor variable pitch blade having a retractable inboard trailing edge.

BACKGROUND

Open rotors or unducted fans have been considered as alternatives to ducted fans to provide for higher bypass ratios and better thrust specific fuel consumption through propulsive efficiency and by eliminating the weight and drag of a nacelle. Various types of open rotor architectures include single rotor (SR), single rotor plus vane (for swirl and thrust recovery) (SRV) and counterrotating open rotor (CROR). The swirl recovery in SRV allows for better stage efficiency than SR configurations without the noise levels of CROR configurations.

Open rotor architectures typically incorporate variable pitch blades for the rotor in order to allow for variations in power settings. Variable pitch rotor blades are utilized to allow for a range of thrust levels (including reverse thrusts) over a relatively small rotational speed range for the rotor. Wide chord variable pitch blades, when coupled with a contoured inner diameter endwall, can open significant gaps between the inner diameter (ID) edge of the variable pitch blade and the ID end wall that can impact performance of the engine, such as by causing distortions to the airflow into the core inlet downstream of the rotor. End gaps allow a portion of the air to bypass the rotor stage as well as disrupt the flow field, both of which reduce the overall efficiency of the stage. Thus, some manner for limiting the gaps between the ID edge of the variable pitch blade and the ID end wall can greatly improve open rotor engine efficiency.

SUMMARY

This disclosure relates to open rotor variable pitch blades.

In a first embodiment, an apparatus comprises a variable pitch blade configured to connect with an endwall of an open rotor engine. The variable pitch blade defines a chamber therein on a bottom edge thereof. A retractable edge member pivotally connects within the chamber to move between a first position wherein at least a portion of the retractable edge member is located within the chamber and a second position wherein a portion of the retractable edge member extends downward from the bottom edge of the variable pitch blade to block a gap between the bottom edge of the variable pitch blade and the endwall.

Any single one or any combination of the following features may be used with the first embodiment. The apparatus where the variable pitch blade defines the chamber at a trailing edge of the bottom edge of the variable pitch blade. The variable pitch blade may include a rotor blade of a rotor of the open rotor engine. The variable pitch blade may include a stator blade of the open rotor engine. The retractable edge member is connected to move between at least one further position between the first position and the second position. The apparatus further including an actuator configured to selectively move the retractable edge member between the first position and the second position. The actuator may include a spring configured to overcome centrifugal loading of the retractable edge member to move the retractable edge member from the first position to the second position. The actuator may include a counterweight configured to overcome centrifugal loading of the retractable edge member to move the retractable edge member from the first position to the second position. The apparatus where the variable pitch blade defines the chamber at a leading edge of the bottom edge of the variable pitch blade.

In a second embodiment, an open rotor engine including an engine core. The engine also includes a rotor having a plurality of variable pitch rotor vanes mounted to an endwall of the engine core, where each of the plurality of variable pitch rotor vanes define a chamber therein on a bottom trailing edge thereof. A plurality of retractable trailing edge members each pivotally connected within the chamber of a variable pitch rotor vane to move between a first position where at least a portion of the retractable trailing edge member is located within the chamber and a second position where a portion of the retractable trailing edge member extends downward from the bottom trailing edge of the variable pitch rotor vane to block a gap between the bottom trailing edge of the variable pitch rotor vane and the endwall.

Any single one or any combination of the following features may be used with the second embodiment. The open rotor engine may include: a stator having a plurality of variable pitch stator vanes mounted to a second endwall of the engine core, where each of the plurality of variable pitch stator vanes define a second chamber therein on a second bottom trailing edge thereof; and a plurality of second retractable trailing edge members each pivotally connected within the second chamber of a variable pitch stator vane to move between a first position, where the second retractable trailing edge member is located within the second chamber and a second position where a portion of the second retractable trailing edge member extends downward from the bottom second trailing edge of the variable pitch stator vane to block a second gap between the bottom trailing edge of the variable pitch stator vane and the second endwall. The plurality of retractable trailing edge members are connected to move between at least one further position between the first position and the second position. The open rotor engine further including a plurality of actuators each associated with one of the plurality of retractable trailing edge members and configured to selectively move the plurality of retractable trailing edge members between the first position and the second position. Each of the plurality of actuators may include a plurality of springs each configured to overcome centrifugal loading of the retractable edge member to move the retractable trailing edge member from the first position to the second position. The actuator may include a plurality of counterweights each configured to overcome centrifugal loading of the retractable edge member to move the retractable trailing edge member from the first position to the second position.

In a third embodiment, a method also includes connecting a variable pitch blade with an endwall of an open rotor engine, defining a chamber within the variable pitch blade on a bottom edge thereof, pivotally connecting a retractable edge member within the chamber, and moving the retractable edge member within the chamber between a first position where at least a portion of the retractable edge member is located within the chamber and a second position where a portion of the retractable edge member extends downward from the bottom edge of the variable pitch blade to block a gap between the bottom edge of the variable pitch blade and the endwall.

Any single one or any combination of the following features may be used with the third embodiment. The method where the step of defining further may include defining the chamber at a trailing edge of the bottom edge of the variable pitch blade. The variable pitch blade may include a rotor blade of a rotor of the open rotor engine. The method may include moving the retractable edge member between at least one further position between the first position and the second position. The method further including selectively moving the retractable edge member between the first position and the second position using an active actuator. The method further including selectively moving the retractable edge member between the first position and the second position using a passive actuator.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 11, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
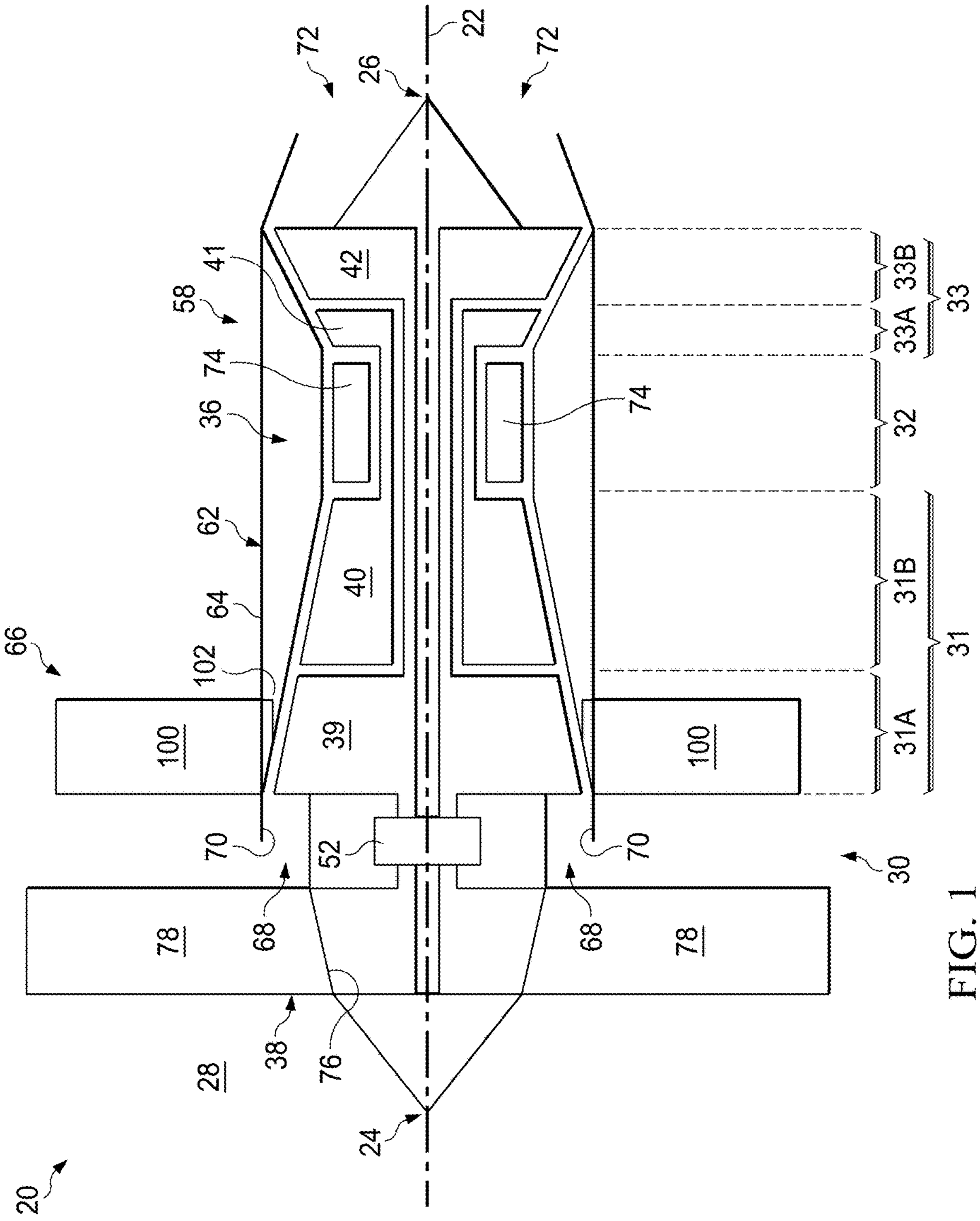
FIG. 1 illustrates a side schematic view of a swirl recovery vane (SRV) open rotor propulsion system.

FIG. 1 illustrates a propulsion system 20 for an aircraft. The aircraft may be an airplane, a drone (such as an unmanned aerial vehicle (UAV)), or any other manned or unmanned aerial vehicle or system. The aircraft propulsion system 20 extends axially along an axis 22 between a forward upstream end 24 of the aircraft propulsion system 20 and an aft downstream end 26 of the aircraft propulsion system 20. The axis 22 may be a centerline axis of the aircraft propulsion system 20 and/or one or more of its members. The axis 22 may also or alternatively be a rotational axis of one or more members of the aircraft propulsion system 20.

The aircraft propulsion system 20 of FIG. 1 is configured as an open rotor propulsion system, such as a swirl recovery vane (SRV) open rotor propulsion system. Here, the term "open" may describe a propulsion system section and/or a propulsion system component that is open to an external environment 28 (such as an ambient environment) external to the aircraft propulsion system 20 and more generally the aircraft. The aircraft propulsion system 20 of FIG. 1, for example, includes an open propulsor section 30, a compressor section 31, a combustor section 32, and a turbine section 33. The compressor section 31 of FIG. 1 includes a low-pressure compressor (LPC) section 31A and a high-pressure compressor (HPC) section 31B. The turbine section 33 of FIG. 1 includes a high-pressure turbine (HPT) section 33A and a low-pressure turbine (LPT) section 33B. At least (or only) the LPC section 31A, the HPC section 31B, the combustor section 32, the HPT section 33A, and the LPT section 33B collectively form a gas generator 36, such as a turbine engine core. The gas generator 36 of FIG. 1 is depicted as an inline forward flowing two spool gas generator however other gas generator architectures including reverse flow, three spool (such as with a dedicated power turbine to mechanically power the propulsor section independent of the remainder of the gas generator) and offset cores are all considered within the scope of this disclosure.

The propulsor section 30 includes a bladed propulsor rotor 38. The propulsor rotor 38 of FIG. 1 is configured as an open rotor (such as an un-ducted rotor) that projects radially into and is exposed to the external environment 28. The LPC section 31A includes an LPC rotor 39, and the HPC section 31B includes an HPC rotor 40. The HPT section 33A includes an HPT rotor 41, and the LPT section 33B includes an LPT rotor 42. Each of the bladed rotors 39-42 of FIG. 1 is configured as a ducted rotor internal within the aircraft propulsion system 20 and outside of the external environment 28. Though not illustrated, it is understood that each of the LPC section 31A, the HPC section 31B, the HPT section 33A and the LPT section 33B may include one or more bladed rotors 39-42.

During operation of the aircraft propulsion system 20, ambient air within the external environment 28 is propelled by the propulsor rotor 38 in an aft downstream direction towards the propulsion system downstream end 26. A major portion (such as more than 50%) of this air bypasses the gas generator 36 to provide forward thrust while a minor portion (such as less than 50%) of the air flows into the gas generator 36. An outer stream of the air propelled by the propulsor rotor 38, for example, flows axially across a guide vane structure 66 of the propulsor section 30 and outside of the propulsion system housing 58 (along the nacelle wall 64 of the nacelle 62). The guide vane structure 66 is configured to condition (such as straighten out) the air propelled by the propulsor rotor 38, for example, to remove or reduce circumferential swirl and thereby enhance the forward thrust. An inner stream of the air propelled by the propulsor rotor 38 flows through an airflow core inlet 68 of a core flow path 70 into the aircraft propulsion system 20 and its gas generator 36. The core flow path 70 extends sequentially through the LPC section 31A, the HPC section 31B, the combustor section 32, the HPT section 33A, and the LPT section 33B from the core inlet 68 to a combustion products exhaust 72 from the core flow path 70 into the external environment 28. The air entering the core flow path 70 may be referred to as "core air."

The core air is compressed by the LPC rotor 39 and the HPC rotor 40 and directed into a combustion chamber 74 (such as an annular combustion chamber) of a combustor (such as an annular combustor) in the combustor section 32. Fuel is injected into the combustion chamber 74 and mixed with the compressed core air to provide a fuel-air mixture. This fuel-air mixture is ignited, and combustion products thereof flow through and sequentially drive rotation of the HPT rotor 41 and the LPT rotor 42. The rotation of the HPT rotor 41 and the LPT rotor 42 respectively drive rotation of the HPC rotor 40 (via a high spool or high speed shaft) and the LPC rotor 39 (via a low spool or low speed shaft) and thus compression of the air received from the core inlet 68. The rotation of the LPT rotor 42 also drives rotation of the propulsor rotor 38 through the geartrain 52. The rotation of the propulsor rotor 38 in turn propels the ambient air within the external environment 28 in the aft downstream direction. With this arrangement, the gas generator 36 powers operation of (such as drives rotation of) the propulsor rotor 38 during aircraft propulsion system operation.

The propulsor rotor 38 of FIG. 1 includes a propulsor rotor endwall 76 (such as a disk or a hub) and a plurality of open propulsor blades 78 (such as airfoils). The propulsor blades 78 are arranged circumferentially about the endwall 76 and the axis 22 in an array, such as a circular array. Each of the propulsor blades 78 is connected to (such as formed integral with or otherwise attached to) the endwall 76. If the propulsor blades 78 are variable pitch blades, the blades will rotate between different positions based on the thrust required from the engine. Rotation of the propulsor blades 78 can create gaps between the blades 78 and the endwall 76 (as will be more fully described herein below) that allows airflow to bypass the stage and interfere with airflow into the core inlet 68.

The guide vane structure 66 includes a plurality of stators 100 (such as airfoils or guide vanes) arranged circumferentially about the axis 22 in an array, such as a circular array. This guide vane structure 66 and its stators 100 are arranged axially next to (such as adjacent) the propulsor rotor 38 and its propulsor blades 78. The guide vane structure 66 and its stators 100, for example, are arranged downstream of the propulsor rotor 38 and its propulsor blades 78, without (such as any) other elements axially therebetween to obstruct, turn, and/or otherwise influence the air propelled by the propulsor rotor 38 to the guide vane structure 66 for example. Each of the stators 100 is coupled to a support structure 102 of the propulsion system housing 58. This support structure 102 may be a support frame, a case, or another fixed structure of the propulsion system housing 58.

Figure 2:
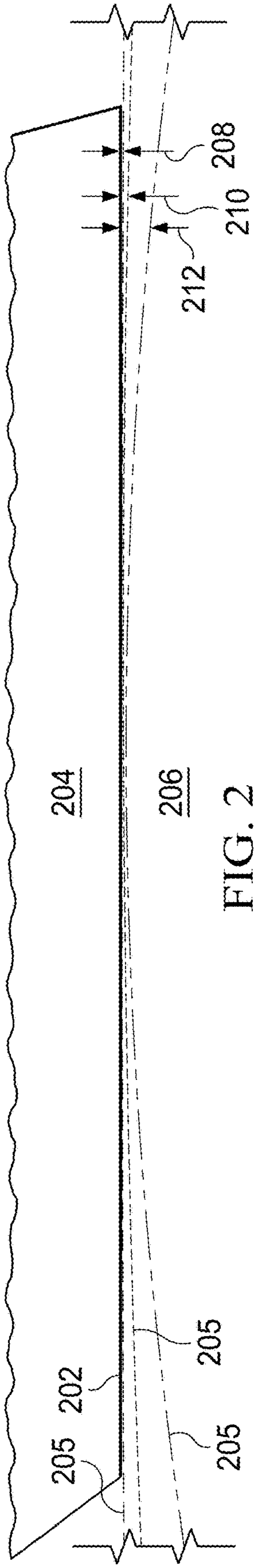
FIG. 2 illustrates the gaps created when a variable pitch blade rotates between a feather pitch position and a maximum takeoff (MTO) pitch position with an axisymmetric cylindrical endwall.
Figure 4A:
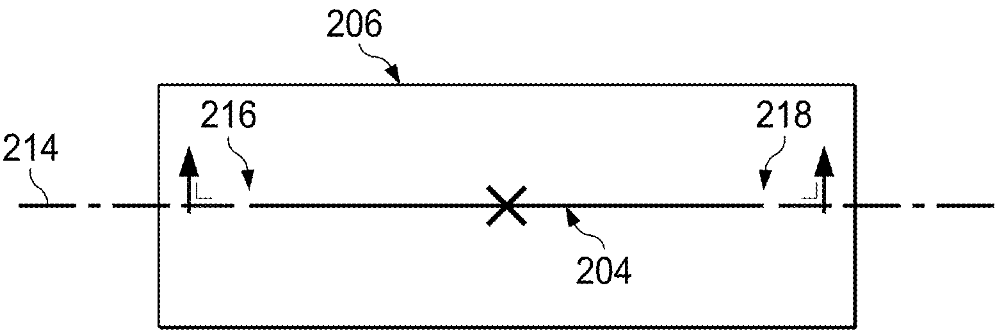
FIG. 4A illustrates the position of a variable pitch blade with respect to the endwall in a feather pitch position.
Figure 4B:
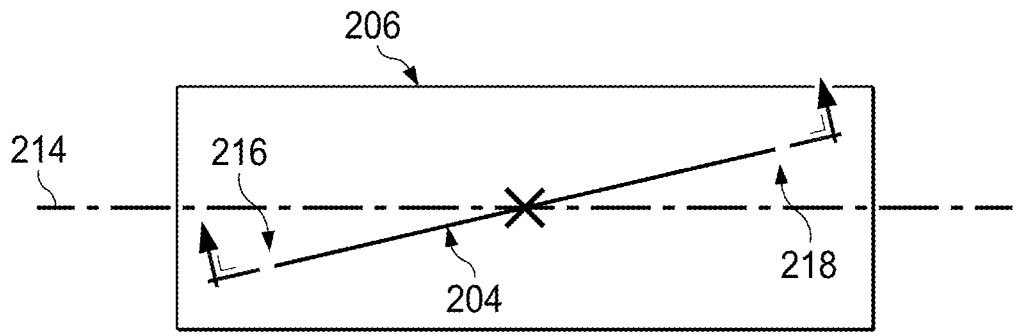
FIG. 4B illustrates the position of a variable pitch blade with respect to the endwall in an aero design point (ADP) pitch position.
Figure 4C:
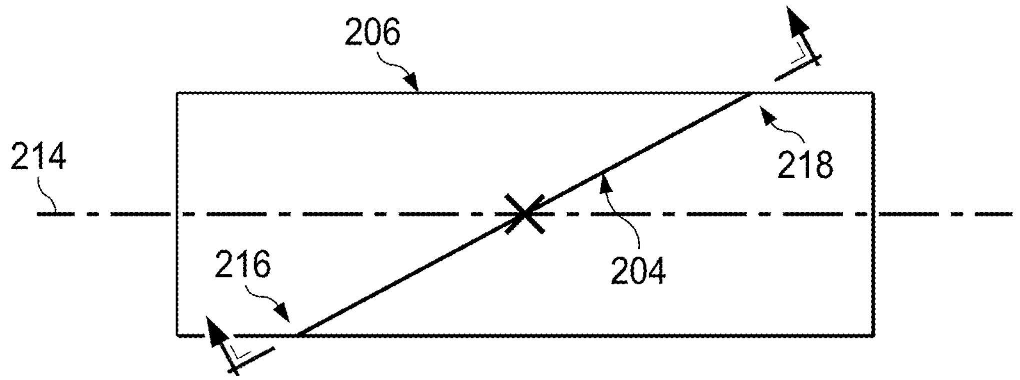
FIG. 4C illustrates the position of a variable pitch blade with respect to the endwall in an MTO pitch position.

Referring now to FIG. 2, illustrated are the gaps that may be created between the inner diameter edge 202 of the variable pitch blade 204 (such as propulsor blade 78) and the surface edge 205 of the inner diameter endwall 206 (such as endwall 76 of FIG. 1) of an open rotor engine. The illustration of FIG. 2 illustrates the changes in end gaps between the edge 202 of a variable pitch blade 204 and the surface edge 205 of the endwall 206 in a feather pitch position providing a gap 208, an aero design point (ADP) pitch position providing a gap 210, and a maximum (power) take-off (MTO) pitch position providing a gap 212. In order to help visualize the reasons for change in the gap size, FIG. 2 is discussed in conjunction with a top view of the position of the variable pitch blade 204 with respect to the endwall 206 in FIG. 4 for the feather pitch position (FIG. 4A), the ADP pitch position (FIG. 4B) and the MTO pitch position (FIG. 4C).

In FIG. 2, the endwall 206 comprises an axisymmetric cylindrical endwall. The root chord line is defined as a line at the root section extending from leading to trailing edge of the airfoil. Thus, as shown in FIG. 4A, when the root chord line of the variable pitch blade 204 is parallel to the central axis 214 of the open rotor engine, the gap 208 between the ID edge 202 of the variable pitch blade 204 and the surface edge 205 of the endwall 206 comprises substantially no gap therebetween. However, when the variable pitch blade 204, schematically shown as the root chord line, is rotated to an ADP pitch position as illustrated in FIG. 4B, the gap 210 between the ID edge 202 of the variable pitch blade 204 and the surface edge 205 of the endwall 206 will increase towards the leading-edge 216 and trailing edge 218 of the variable pitch blade 204. Further, when the variable pitch blade 204, schematically shown as the root chord line, is rotated to an MTO pitch position as illustrated in FIG. 4C, the gap 212 between the ID edge 202 of the variable pitch blade 204 and the surface edge 205 of the endwall 206 will further increase toward the leading-edge 216 and the trailing edge 218 of the variable pitch blade 204.

Figure 3:
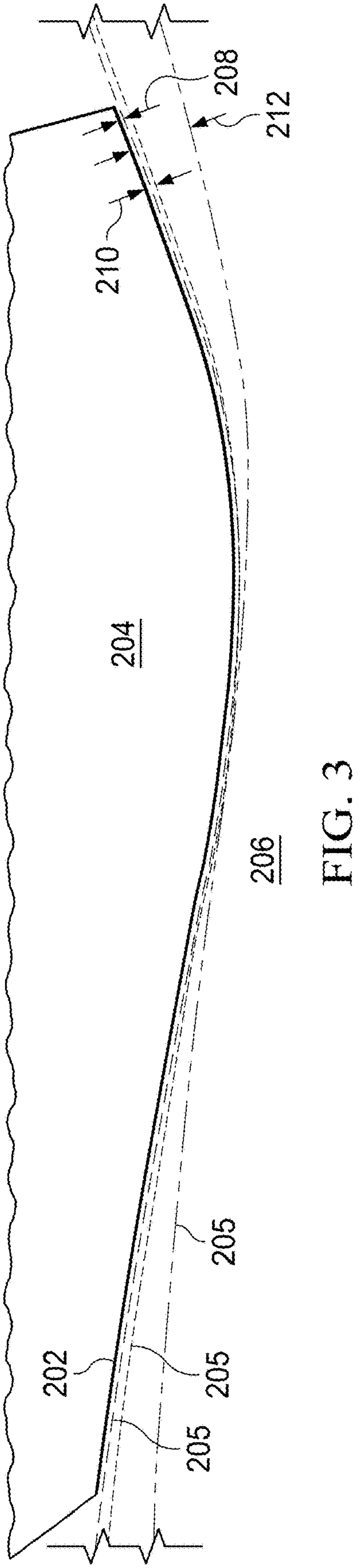
FIG. 3 illustrates the gaps created when a variable pitch blade rotates between a feathered pitch position and an MTO pitch position with an axisymmetric contoured endwall.

Referring now to FIG. 3, there are illustrated the gaps that may be created between the inner diameter edge 202 of the variable pitch blade 204 and the surface edge 205 of endwall 206 of an open rotor engine. The illustration of FIG. 3 illustrates the changes in end gaps between an edge 202 of the variable pitch blade 204 and surface edge 205 of the endwall 206 in a feather pitch position creating a gap 208, an ADP pitch position creating a gap 210 and an MTO pitch position creating a gap 212. In order to help visualize the reasons for change in the gap size, FIG. 3 is also discussed in conjunction with a top view of the position of the variable pitch blade 204 with respect to the endwall 206 in FIG. 4 for the feather pitch position (FIG. 4A), the ADP pitch position (FIG. 4B) and the MTO pitch position (FIG. 4C).

In FIG. 3, the endwall 206 comprises an axisymmetric contoured endwall. This can cause even greater edge gaps when rotating between the various pitch positions. Thus, as shown in FIG. 4A, when the variable pitch blade 204 is parallel to the central axis 214 of the open rotor engine, the gap 208 between the ID edge 202 of the variable pitch blade 204 and the surface edge 205 of the endwall 206 comprises substantially no gap therebetween. However, when the variable pitch blade 204 is rotated to an ADP pitch position as illustrated in FIG. 4B, the gap 210 between the ID edge 202 of the variable pitch blade 204 and the surface edge 205 of the endwall 206 will increase towards the leading-edge 216 and trailing edge 218 of the variable pitch blade 204. Further, when the variable pitch blade 204 is rotated to an MTO pitch position as illustrated in FIG. 4C, the gap 212 between the ID edge 202 of the variable pitch blade 204 and the surface edge 205 of the endwall 206 will further increase toward the leading-edge 216 and the trailing edge 218 of the variable pitch blade 204.

The magnitude of the end gaps between the ID edge 202 of the variable pitch blade 204 and the surface edge 205 of the endwall 206 are dependent upon a number of factors. These include the design range of pitch motion for the variable pitch blade 204, the chord length along the ID edge 202 of the variable pitch blade 204 and the endwall geometry including diameter and magnitude of the endwall shaping. In some situations, the trailing edge ID corner of a variable pitch blade 204 needs to be clipped to allow a sufficient range of pitch motion to reach reverse thrust pitch to avoid clashing with adjacent variable pitch blades 204. This can further increase the size of the gap. Limiting the flow field between the trailing edge ID of an open rotor variable pitch blade 204 is especially important since this flow can influence flow distortion at the core inlet 68 (FIG. 1).

Figure 5:
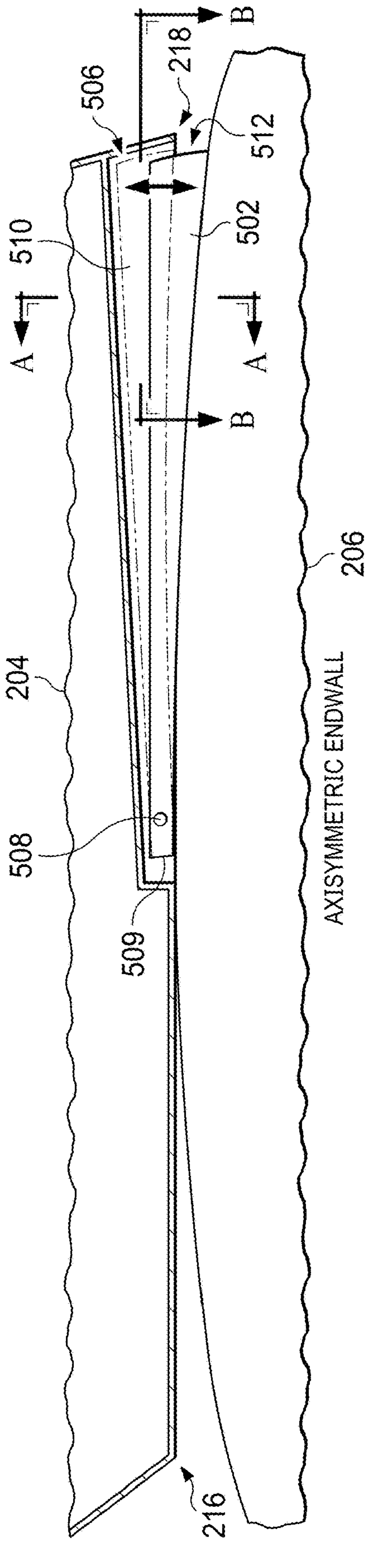
FIG. 5 illustrates a variable pitch blade having a retractable trailing edge that pivots between first and second positions.

Referring now to FIG. 5 there is illustrated an embodiment of a variable pitch blade 204 having a retractable trailing edge 502 for substantially decreasing the size of a gap between the ID trailing edge 218 of the variable pitch blade 204 and a surface of an asymmetric endwall 206. The variable pitch blade 204 with an adaptive inner diameter trailing edge 218 can minimize end gaps across the range of performance of critical pitch angles to help maximize propulsor efficiency and minimize core inlet distortion. A retractable trailing edge 502 at the ID trailing edge 218 fills the end gap across a desired range of pitch angles. In order to minimize the range of motion, the retractable trailing edge 502 can be sized to extend as far as needed to minimize the gap at a pitch setting such as MTO (or another pitch position) and allow the end gap to open beyond the selected pitch setting such as to flat pitch/reverse thrust pitch.

While the following discussion is made with respect to the use of a retractable trailing edge 502 for use on the trailing edge 218 of a variable pitch blade 204, it will be appreciated that a retractable leading-edge may also be associated with the leading-edge 216 of a variable pitch blade 204 to similarly decrease the size of the gap between the leading-edge 216 of the variable pitch blade 204 and the surface of the endwall 206. Additionally, while the following description is made with respect to retractable edges for use with the variable pitch blades 204 of a rotor, the blades of a stator may also include retractable leading and trailing edges in order to limit the effects of airflow through gaps between the ID edge of a stator and the endwall surface adjacent to the stator. The endwall 206 referenced with respect to the discussions in FIG. 5 may comprise an axisymmetric cylindrical endwall, an axisymmetric contoured endwall or any other endwall configuration that may cause gaps between the edges of the variable pitch blade 204 and the endwall 206. Furthermore, the retractable trailing edge 502 is applicable to any open rotor configuration such as single rotor with swirl recovery vane, counterrotating open rotor, single rotor, etc.

The retractable trailing edge 502 comprises a member extending from substantially near the trailing edge 218 of the variable pitch blade 204 toward the central portion of the variable pitch blade. A chamber 506 is defined within the bottom edge of the variable pitch blade 204 into which the retractable trailing edge 502 may be inserted. The retractable trailing edge 502 may comprise a three-dimensional structure or alternatively may comprise a plate that rotates into and out of the bottom of the trailing edge of the variable pitch blade 204 in order to decrease the gap between the trailing edge 218 and the top surface of the endwall 206.

The retractable trailing edge 502 is connected to the variable pitch blade 204 via a hinge point 508 located proximate a first end 509 of the retractable trailing edge 502. The retractable trailing edge 502 rotates upon the hinge point 508 between a first position and a second position. When in the first position as illustrated generally at 510 by the dashed lines in FIG. 5, the retractable trailing edge 502 is located completely within the variable pitch blade 204 and does not extend below the trailing edge ID of the variable pitch blade 204. The position illustrated generally at 510 would be the position of the retractable trailing edge 502 when the variable pitch blade 204 was in the feather pitch position. In this case, there is substantially no gap located between the trailing edge 218 of the variable pitch blade 204 and the top surface of the endwall 206, and thus no filling of the gap is required. When in the second position as illustrated generally at 512, the retractable trailing edge 502 rotates out of the chamber 506 such that a portion of the retractable trailing edge 502 extends below the trailing edge 218 of the variable pitch blade 204. The second position 512 would be utilized when the variable pitch blade 204 was in the MTO pitch position. Within the MTO pitch position, a larger gap exists between the trailing edge 218 of the variable pitch blade 204 and the surface of the endwall 206. Opening of the retractable trailing edge 502 to the second position 512 substantially blocks this larger gap eliminating airflow therethrough. It should also be appreciated that one or more intermediate positions could be included between the first position 510 and the second position 512.

Figure 6:
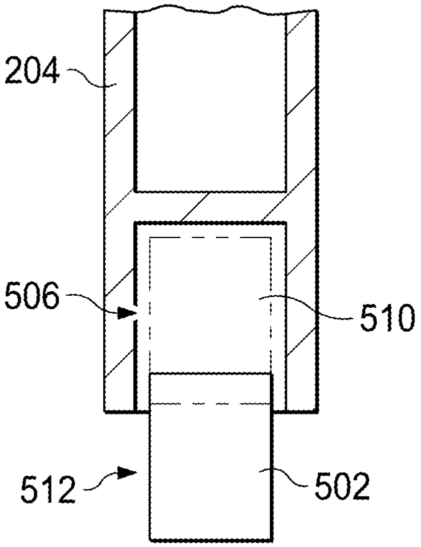
FIG. 6 illustrates a first cross-sectional view of the retractable trailing edge.

Referring now to FIG. 6, there is illustrated a first cross-sectional view A-A from FIG. 5 of an end view of the retractable trailing edge 502. The variable pitch blade 204 defines the chamber 506 for containing the retractable trailing edge 502. Position 510 illustrated in dashed lines shows the position of the retractable trailing edge 502 when located completely within the chamber 506 in, for example, the feather pitch position. Position 512 illustrates the retractable trailing edge 502 in the lowered second position 512 when the variable pitch blade 204 is in the MTO pitch position. The chamber 506 comprises a hollow pocket within the variable pitch blade 204, into which the retractable trailing edge 502 may be recessed in the first position 510. As discussed previously, while the retractable trailing edge 502 is illustrated as a three-dimensional component, a single plate could be used to fill the gap between the ID edge of the variable pitch blade 204 and the surface of the endwall 206.

Figure 7:
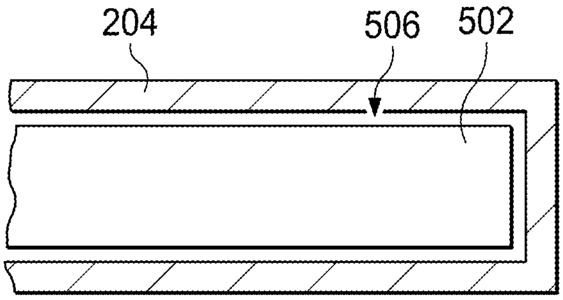
FIG. 7 illustrates a second cross-sectional view of the retractable trailing edge.

Referring now also to FIG. 7, there is illustrated a second cross-sectional view B-B from FIG. 5 of a top view of the retractable trailing edge 502. This more particularly illustrates the chamber 506 defined within the interior of the variable pitch blade 204. The retractable trailing edge 502 would be connected to pivotally move into and out of the chamber 506 depending on the pitch position of the variable pitch blade 204. While the trailing edge is depicted in FIG. 7 as a sharp angle, a rounded or full radius may also be utilized within the trailing edge.

Figure 8:
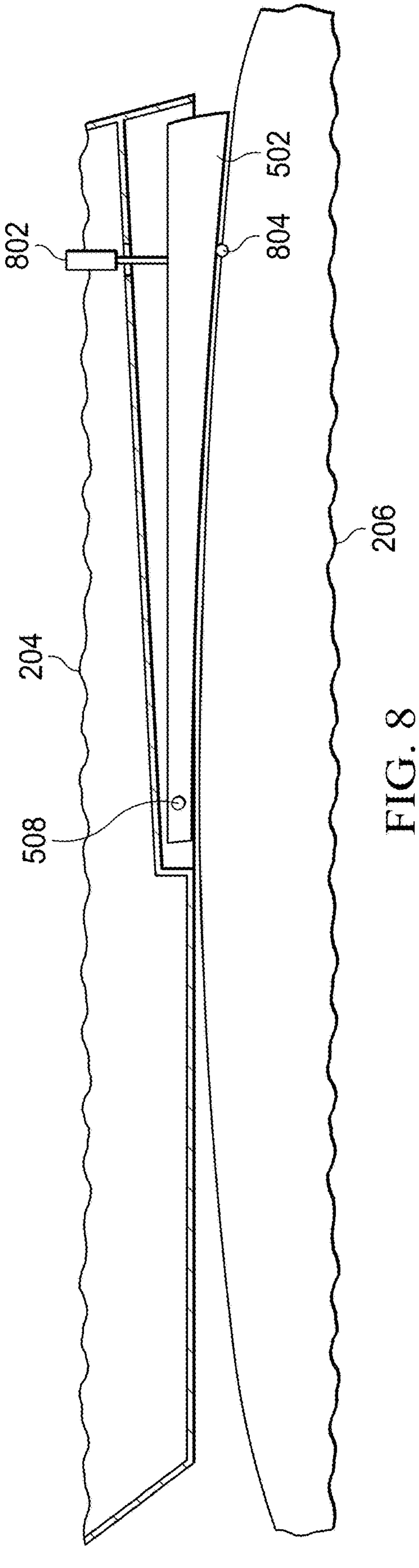
FIG. 8 illustrates a first embodiment of an active actuator for the retractable trailing edge.
Figure 9:
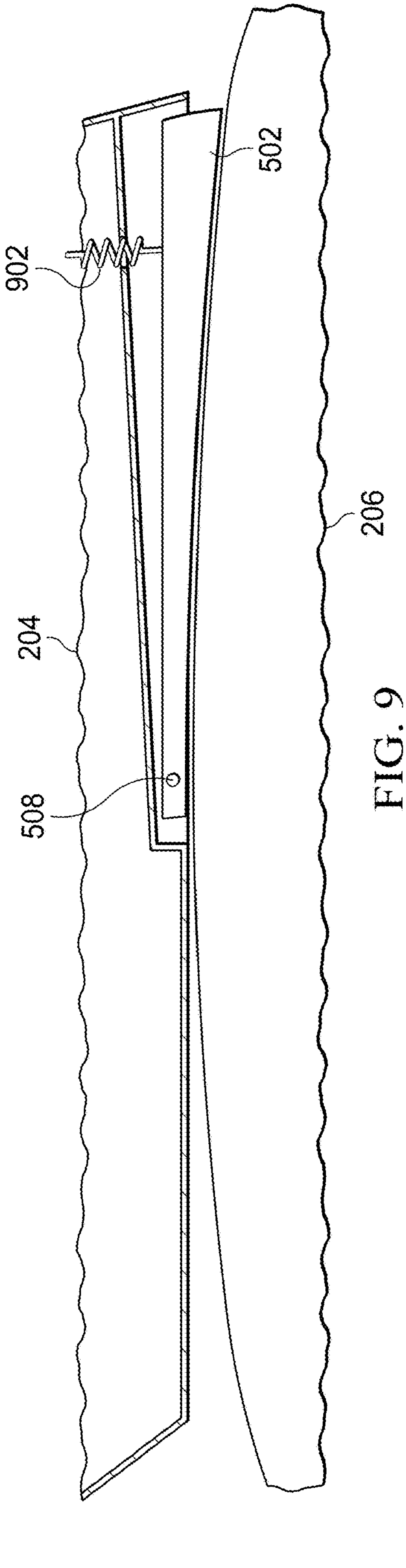
FIG. 9 illustrates a second embodiment of a passive actuator for the retractable trailing edge.
Figure 10:
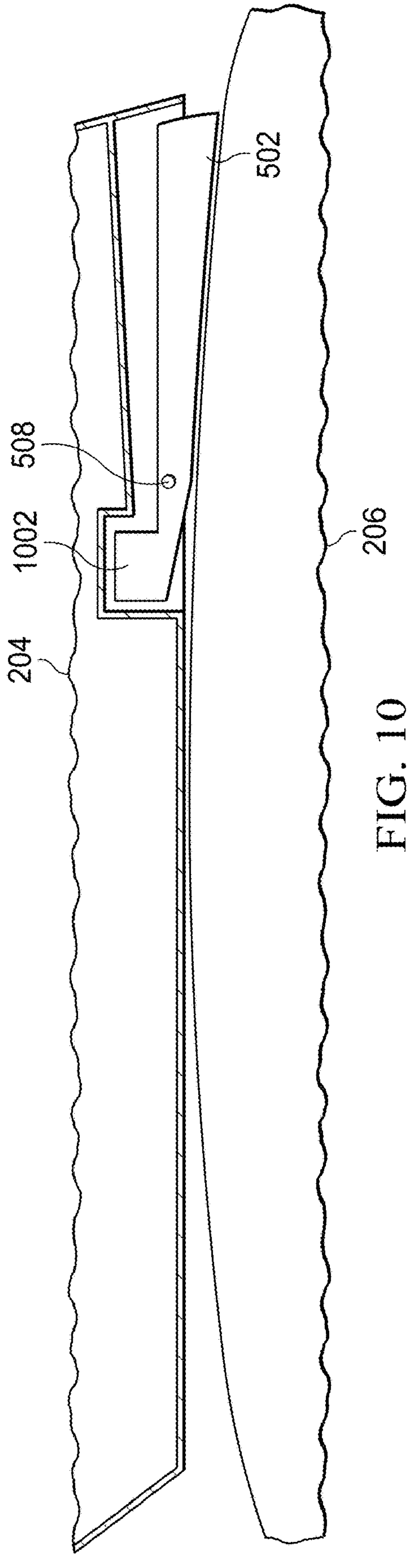
FIG. 10 illustrates a third embodiment of a passive actuator for the retractable trailing edge.

Actuation of the retractable trailing edge 502 may be accomplished through multiple methods as more particularly illustrated in FIGS. 8-10. In a first embodiment illustrated in FIG. 8, an actuator 802 may be used to move the retractable trailing edge 502 between the first position 510 and second position 512 and any position therebetween within the variable pitch blade 204. The actuator 802 may be electric, hydraulic, mechanical, etc. to provide active actuation of the retractable trailing edge 502. Furthermore, a nub/contact point 804 may be included on the inner diameter of the retractable trailing edge 502 that slides/follows the endwall 206 to determine maximum movement to the second position 512 and minimizes the gap as the variable pitch blade 204 moves between pitch settings.

In other embodiments, passive actuation of the retractable trailing edge 502 may be provided by a spring 902 as illustrated in FIG. 9. The spring 902 is sized to apply a force to overcome centrifugal loading when the variable pitch blade 204 is rotating. Alternatively, the retractable trailing edge 502 may be centrifugally end loaded via a counterweight 1002 as illustrated in FIG. 10. In this case, the counterweight 1002 is placed on the opposite side of the hinge point 508 such that the retractable trailing edge 502 will open in order to fill the gap between the variable pitch blade 204 and the endwall 206 when the centrifugal forces acting on the retractable trailing edge are overcome by the centrifugal forces acting on the counterweight. Thus, the centrifugal forces acting on the counterweight 1002 would overcome the centrifugal forces acting on the opposite end of the retractable trailing edge 502 on the other side of the pivot from the counterweight such that the counterweight 1002 moves radially outward, pushing the retractable trailing edge end radially inward to contact the endwall and minimize the gap. While not depicted in FIG. 9 or 10, it is understood that a nub/contact point 804 (FIG. 8) could be included to limit the motion of the retractable trailing edge 502 when it contacts the endwall 206.

Figure 11:
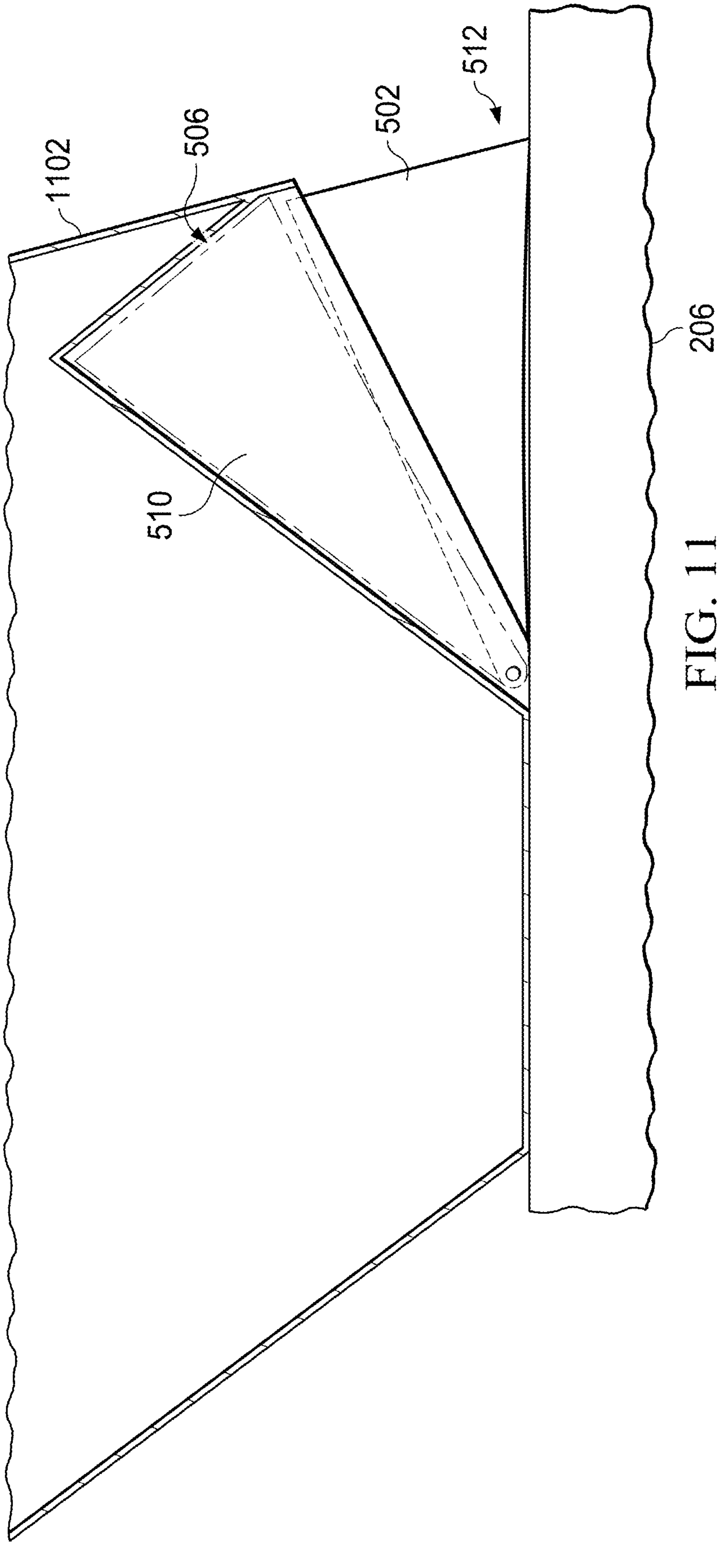
FIG. 11 illustrates an embodiment of a retractable trailing edge for use with a clipped vane.

Referring now to FIG. 11, there is illustrated a further embodiment of the retractable trailing edge 502 wherein the retractable trailing edge is used with a clipped variable pitch blade 1102. In this case, the retractable trailing edge 502 operates in the same manner as described hereinabove. However, the retractable trailing edge 502 includes a larger member in order to overcome the larger gap created between the clipped variable pitch blade edge and the surface of the endwall 206. Additionally, a larger chamber 506 is required to receive the larger retractable trailing edge 502. The retractable trailing edge 502 rotates between the first position 510 and the second position 512 responsive to different pitch positions of the clipped variable pitch blade 1102 as described previously. In this embodiment, the first position 510 would correspond to the pitch position where the trailing edge could otherwise clash with the leading edge of the adjacent blade if not retracted rather than a feather pitch setting. The position of the retractable trailing edge corresponding with a feather pitch position would be between the defined and depicted first position 510 and second position 512.

Using the retractable trailing edge 502 in order to minimize end gaps between a variable pitch blade 204 and the surface of the endwall 206 will minimize performance losses across a range of pitch angles of interest. This will help to maximize efficiency between ADP and MTO pitch without worrying about flat pitch/reverse thrust pitch. The quality of airflow into the core inlet can be maintained thus helping with low-pressure compressor (LPC) operability.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

a variable pitch blade configured to connect with an endwall of an open rotor engine, the variable pitch blade defining a chamber therein on a bottom edge thereof; and a retractable edge member pivotally connected within the chamber to move between a first position wherein at least a portion of the retractable edge member is located within the chamber and a second position wherein a portion of the retractable edge member extends downward from the bottom edge of the variable pitch blade to block a gap between the bottom edge of the variable pitch blade and the endwall.

2. The apparatus of claim 1, wherein the variable pitch blade defines the chamber at a trailing edge of the bottom edge of the variable pitch blade.

3. The apparatus of claim 1, wherein the variable pitch blade comprises a rotor blade of a rotor of the open rotor engine.

4. The apparatus of claim 1, wherein the variable pitch blade comprises a stator vane of the open rotor engine.

5. The apparatus of claim 1, wherein the retractable edge member is connected to move between at least one further position between the first position and the second position.

6. The apparatus of claim 1 further including an actuator configured to selectively move the retractable edge member between the first position and the second position.

7. The apparatus of claim 1 further including a spring configured to overcome centrifugal loading of the retractable edge member to move the retractable edge member from the first position to the second position.

8. The apparatus of claim 1 further including a counterweight configured to overcome centrifugal loading of the retractable edge member to move the retractable edge member from the first position to the second position.

9. The apparatus of claim 1, wherein the variable pitch blade defines the chamber at a leading edge of the bottom edge of the variable pitch blade.

10. An open rotor engine comprising:

an engine core;

a rotor having a plurality of variable pitch rotor blades mounted to an endwall of the engine core, wherein each of the plurality of variable pitch rotor blades define a chamber therein on a bottom trailing edge thereof; and a plurality of retractable trailing edge members each pivotally connected within the chamber of a variable pitch rotor blade to move between a first position wherein at least a portion of the retractable trailing edge member is located within the chamber and a second position wherein a portion of the retractable trailing edge member extends downward from the bottom trailing edge of the variable pitch rotor blade to block a gap between the bottom trailing edge of the variable pitch rotor blade and the endwall.

11. The open rotor engine of claim 10 further comprising:

a stator having a plurality of variable pitch stator vanes mounted to a second endwall of the engine core, wherein each of the plurality of variable pitch stator vanes define a second chamber therein on a second bottom trailing edge thereof; and a plurality of second retractable trailing edge members each pivotally connected within the second chamber of a variable pitch stator vane to move between a first position, wherein the second retractable trailing edge member is located within the second chamber and a second position wherein a portion of the second retractable trailing edge member extends downward from the bottom second trailing edge of the variable pitch stator vane to block a second gap between the bottom trailing edge of the variable pitch stator vane and the second endwall.

12. The open rotor engine of claim 10, wherein the plurality of retractable trailing edge members are connected to move between at least one further position between the first position and the second position.

13. The open rotor engine of claim 10 further including a plurality of actuators each associated with one of the plurality of retractable trailing edge members and configured to selectively move the plurality of retractable trailing edge members between the first position and the second position.

14. The open rotor engine of claim 10 further comprising a plurality of springs each configured to overcome centrifugal loading of the retractable edge member to move the retractable trailing edge member from the first position to the second position.

15. The open rotor engine of claim 10 further comprising a plurality of counterweights each configured to overcome centrifugal loading of the retractable edge member to move the retractable trailing edge member from the first position to the second position.

16. A method comprising:

connecting a variable pitch blade with an endwall of an open rotor engine;

defining a chamber within the variable pitch blade on a bottom edge thereof;

pivotally connecting a retractable edge member within the chamber; and moving the retractable edge member within the chamber between a first position wherein at least a portion of the retractable edge member is located within the chamber and a second position wherein a portion of the retractable edge member extends downward from the bottom edge of the variable pitch blade to block a gap between the bottom edge of the variable pitch blade and the endwall.

17. The method of claim 16, wherein the step of defining further comprises defining the chamber at a trailing edge of the bottom edge of the variable pitch blade.

18. The method of claim 16 further comprising moving the retractable edge member between at least one further position between the first position and the second position.

19. The method of claim 16 further including selectively moving the retractable edge member between the first position and the second position using an active actuator.

20. The method of claim 16 further including selectively moving the retractable edge member between the first position and the second position using a passive actuator.

* * * * *